(12) United States Patent
Moffat et al.

(10) Patent No.: US 6,695,094 B2
(45) Date of Patent: Feb. 24, 2004

(54) ACOUSTIC MUFFLER FOR TURBINE ENGINE

(75) Inventors: George H. Moffat, Mill Creek, WA (US); Gene Woodard Stubbs, Seattle, WA (US); William Albert Voll, Lynnwood, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/776,552

(22) Filed: Feb. 2, 2001

(65) Prior Publication Data

US 2002/0104707 A1 Aug. 8, 2002

(51) Int. Cl.[7] .............................. F01N 1/02; F01N 1/00; F01N 1/08
(52) U.S. Cl. .................. 181/249; 181/255; 181/269; 181/272
(58) Field of Search ................ 181/249, 247, 181/248, 250, 255, 266, 267, 269, 272, 273, 276, 282, 224; 123/184.57; 180/309, 89.2, 296

(56) References Cited

U.S. PATENT DOCUMENTS

| 2,016,253 | A | * | 10/1935 | Noblitt et al. | 181/249 |
|---|---|---|---|---|---|
| 3,648,803 | A | * | 3/1972 | Heath et al. | 181/250 |
| 3,680,660 | A | * | 8/1972 | DuBois | 181/250 |
| 3,920,095 | A | * | 11/1975 | Clark | 181/248 |
| 4,091,892 | A | * | 5/1978 | Hehmann et al. | 181/286 |
| 4,137,992 | A | | 2/1979 | Herman | |
| 4,226,297 | A | | 10/1980 | Cicon | |
| 4,314,621 | A | * | 2/1982 | Hansen | 181/233 |
| 4,359,136 | A | * | 11/1982 | Eriksson | 181/269 |
| 4,360,075 | A | * | 11/1982 | Blaser et al. | 181/250 |
| 4,645,032 | A | * | 2/1987 | Ross et al. | 181/250 |
| 4,744,440 | A | * | 5/1988 | Hanson | 181/227 |
| 4,979,587 | A | * | 12/1990 | Hirt et al. | 181/213 |
| 5,268,541 | A | * | 12/1993 | Pettersson | 181/224 |
| 5,365,025 | A | * | 11/1994 | Kraai et al. | 181/249 |
| 6,508,219 | B2 | * | 1/2003 | Schorn | 123/184.57 |

FOREIGN PATENT DOCUMENTS

| JP | 57113919 A | * | 7/1982 | F01N/1/02 |
|---|---|---|---|---|
| JP | 05163925 A | * | 6/1993 | F01N/1/02 |

* cited by examiner

Primary Examiner—Marlon T. Fletcher
Assistant Examiner—Edgardo San Martin
(74) Attorney, Agent, or Firm—Alston & Bird LLP

(57) ABSTRACT

An acoustic muffler for a turbine engine exhaust comprises an outer shell of tubular configuration, a tubular liner disposed within the shell, and a plurality of dividing walls extending between the liner and the outer shell so as to divide the generally annular space between the liner and shell into a plurality of chambers circumferentially spaced about the muffler. A central longitudinal axis of the liner is radially offset from the central longitudinal axis of the shell such that the chambers have different depths in a radial direction of the muffler, and the liner has at least one opening into each chamber. Thus, the muffler has a plurality of chambers of different sizes providing noise attenuation at a plurality of specific tuned frequencies, and the liner provides broad band attenuation.

11 Claims, 2 Drawing Sheets

ACOUSTIC MUFFLER FOR TURBINE ENGINE

FIELD OF THE INVENTION

The present invention relates to devices for attenuating noise of turbine engines. The invention relates more particularly to an acoustic muffler for an exhaust of a turbine engine, the muffler defining a plurality of resonating chambers.

BACKGROUND OF THE INVENTION

Turbine engines are often used in applications in which personnel must work in relatively close proximity to an engine while it is operating. Examples of such applications include use of turbine engines as auxiliary power units (APUs) in various settings, such as on aircraft or watercraft. The noise generated by the engine, if too great, could be detrimental to the personnel. Accordingly, it is not uncommon for noise suppression devices to be required to reduce the noise of the engine to an acceptable level.

One type of noise suppression device is an acoustic muffler that is mounted in the exhaust duct of the engine to reduce the noise associated with the stream of exhaust gases discharged from the engine. A conventional muffler consists of a cylindrical or conical outer housing or shell located concentrically with respect to the exhaust duct and lined with a cylindrical or conical porous sheet metal liner concentric with the outer shell and of smaller diameter than the shell so as to create an annular chamber between the liner and the shell. The chamber functions as a resonator. In the case of a cylindrical muffler, the chamber is tuned to attenuate noise at a single frequency, whereas the chamber of a conical muffler will attenuate noise over a range of frequencies. The porous liner provides broad band noise attenuation.

The exhaust gases from the engine are at a very high temperature. Care must therefore be taken to provide adequate separation between the muffler and other structures in proximity to the muffler. For example, in the case of an APU mounted in the tail cone of an aircraft, the engine exhaust duct typically runs close to the airframe structure. In many aircraft, the airframe structure desirably is constructed of aluminum alloy, as opposed to special high-temperature materials such as titanium alloy or steel, because aluminum is less expensive and easier to process than such materials. However, with the above-described conventional muffler, in some cases it may be impossible to provide sufficient separation between the muffler and the adjacent structure to enable aluminum to be used for such structure. In this event, the airframe structure must be constructed from special high-temperature materials.

It would be desirable, therefore, to provide an acoustic muffler that enables an increased physical separation between the muffler and adjacent structure without sacrificing noise attenuation performance.

SUMMARY OF THE INVENTION

The present invention addresses the above needs by providing an acoustic muffler in which the outer shell and the inner liner are eccentrically located with respect to each other so that when the liner is mounted concentric with respect to the exhaust duct of the engine, the outer shell on one side of the duct projects radially outwardly a smaller distance than would that of a comparable conventional muffler. This side of the outer shell can be oriented toward the closest adjacent structure, thus providing greater separation between the muffler and the structure. The acoustic muffler also provides both broad band frequency attenuation and specific attenuation at a plurality of tuned frequencies.

More particularly, in accordance with a preferred embodiment of the invention, the acoustic muffler comprises an outer shell of tubular configuration, a tubular liner disposed within the shell, and a plurality of dividing walls extending between the liner and the outer shell so as to divide the generally annular space between the liner and shell into a plurality of chambers circumferentially spaced about the muffler. A central longitudinal axis of the liner is radially offset from the central longitudinal axis of the shell such that the chambers have different depths in a radial direction of the muffler, and the liner has at least one opening into each chamber. Thus, the muffler has a plurality of chambers of different sizes providing noise attenuation at a plurality of specific tuned frequencies, and the liner provides broad band attenuation.

In a particular cylindrical embodiment of the muffler, a middle portion of the side wall of the shell is formed as a substantially cylindrical structure, and the side wall includes forward and aft portions respectively joined to forward and aft ends of the middle portion. The forward and aft portions each extends radially inwardly from the middle portion to a radially inner end, and the radially inner ends of the forward and aft portions are joined to the liner. Each chamber extends longitudinally from the forward portion of the side wall to the aft portion of the side wall.

Alternatively, the shell and liner could be conical or could have other than a circular cross section. One or more of the chambers could be subdivided by partition walls into two or more chambers located one after another in the longitudinal direction of the muffler.

Various numbers of chambers can be provided depending on the specific frequencies at which attenuation is desired. In a particular embodiment of the muffler designed for installation in the exhaust duct of a Honeywell 331-400B auxiliary power unit in the tail cone of a 767-400ER aircraft, there are six chambers. The chambers all have approximately the same length in the circumferential direction. The radial depth of the chambers varies continuously in the circumferential direction from a minimum at one side of the muffler to a maximum at the opposite side of the muffler. The depth of each chamber in the radial direction is substantially constant from the forward to the aft end of the chamber. The deepest chamber is slightly more than three times as deep as the shallowest chamber. The side of the muffler having the shallowest chamber is oriented toward the tail cone frame and skin closest to the muffler. The muffler allows sufficient separation between the muffler and the frame and skin such that there is no need to use a high-temperature material for these structures. Furthermore, the muffler reduces the noise at the critical service location by about 3 dBa relative to an exhaust duct without the muffler.

It will be recognized, however, that the principles of the present invention can be applied to various types of turbine engine installations in which the optimum acoustic performance of the muffler and the physical constraints of the installation may dictate a different number of chambers, a different range of chamber depths, etc. The muffler configuration thus is specific to the installation.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

Figure 1:
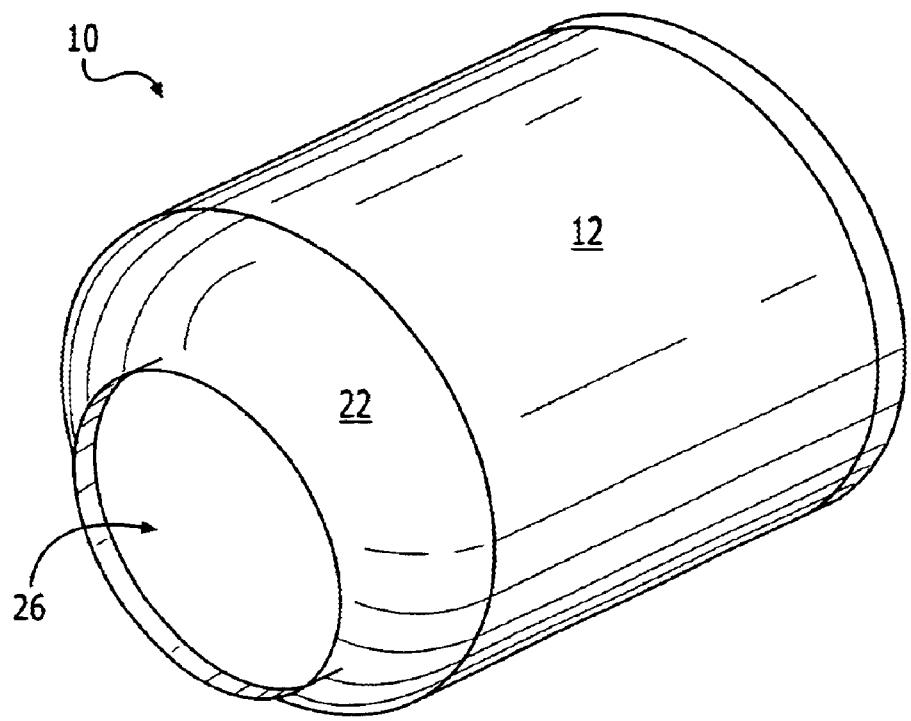
FIG. 1 is a perspective view of an acoustic muffler in accordance with a preferred embodiment of the invention.
Figure 2:
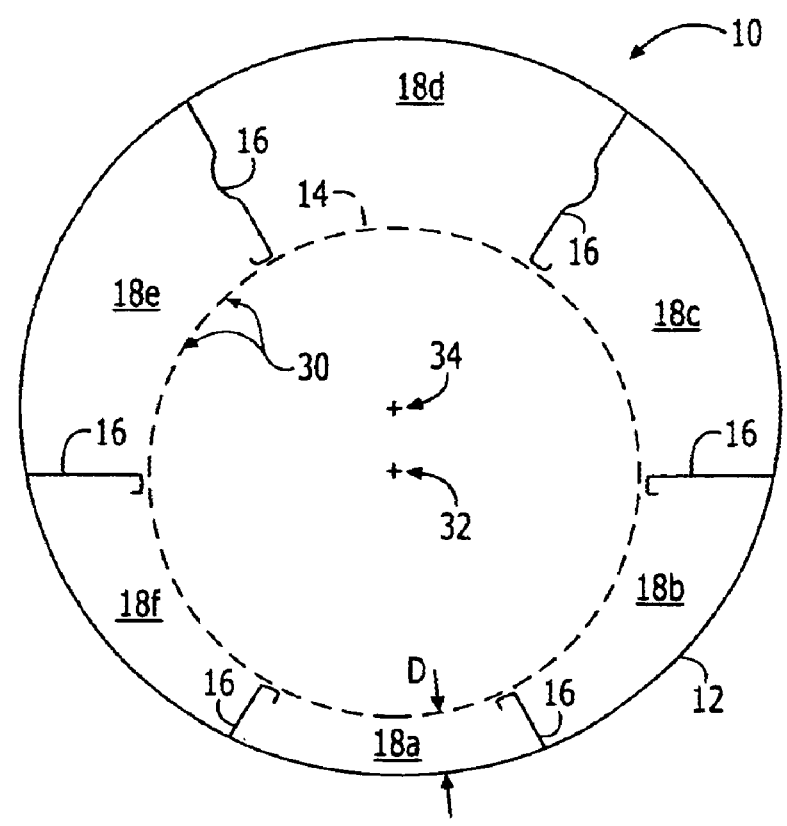
FIG. 2 is a cross-sectional view of the muffler taken on a plane normal to the longitudinal centerline of the muffler.
Figure 3:
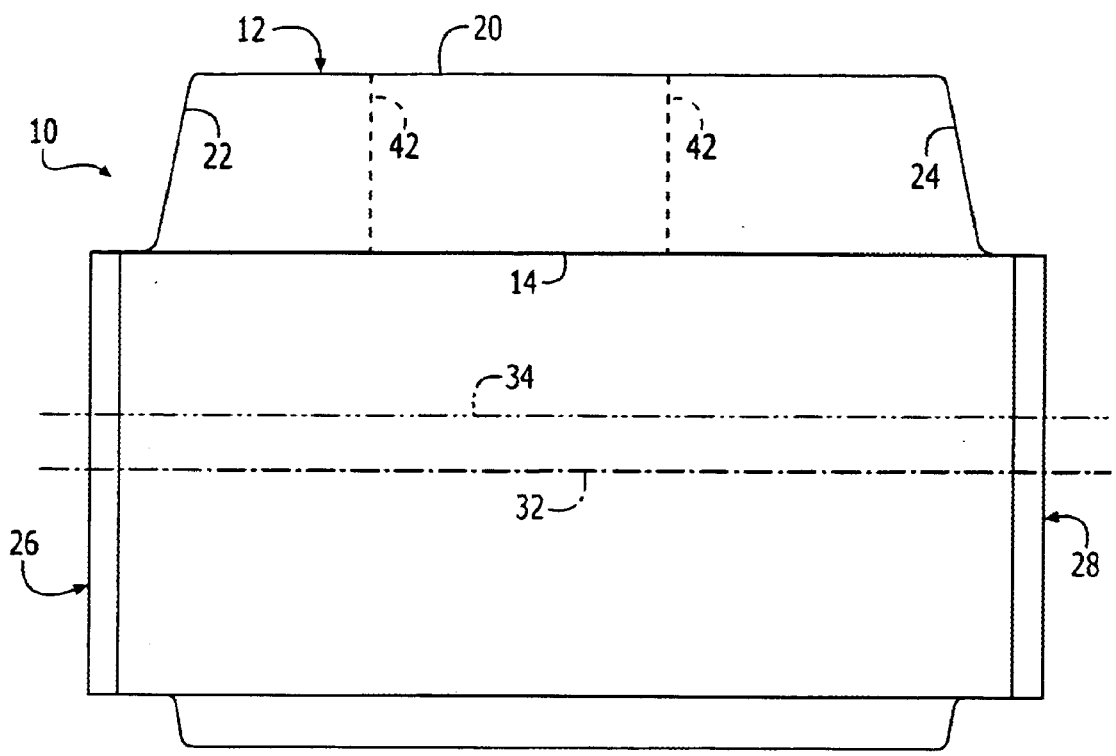
FIG. 3 is a cross-sectional view of the muffler taken on a plane parallel to and passing through the centerline of the muffler.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1 through 4 depict one preferred embodiment of an acoustic muffler 10 in accordance with the invention. The muffler 10 comprises an outer shell 12 of tubular configuration, an inner liner 14 of tubular configuration mounted within the interior of the shell 12, and a plurality of longitudinally extending dividing walls 16 extending between the shell and the liner. The shell, liner, and dividing walls define a plurality of chambers 18a, 18b, 18c, 18d, 18e, and 18f spaced circumferentially about the muffler.

The shell 12 includes a middle portion 20 of circular cylindrical configuration extending for a majority of the length of the muffler. The forward end of the middle portion 20 is joined to a forward portion 22 that extends radially inwardly and slightly forwardly to a radially inner end of the forward portion 22 that is joined to the forward end of the liner 14. Similarly, the aft end of the middle portion 20 is joined to an aft portion 24 that extends radially inwardly and slightly aft to a radially inner end of the aft portion 24 that is joined to the aft end of the liner 14. The radially inner end of the forward portion 22 defines an inlet opening 26 for the muffler, and the radially inner end of the aft portion 24 defines an outlet opening 28.

The liner 14 includes openings 30 into the chambers 18a–f, at least one such opening being provided for each chamber. The liner 14 in the illustrated embodiment is a circular cylindrical structure. The liner 14 is located eccentrically with respect to the shell 12. Thus, the longitudinal central axis 32 of the liner is radially offset from the longitudinal central axis 34 of the cylindrical middle portion 20 of the shell. As a result, the chambers 18a–f all have different depths D in the radial direction. The chamber 18a has the smallest depth D, and the chamber 18d diametrically opposite from the chamber 18a has the largest depth. The other chambers have depths intermediate the minimum and maximum. Accordingly, each chamber functions as a resonator tuned to a different frequency from that of the other chambers. By sizing the chambers appropriately, the chambers can be tuned to specific frequencies at which attenuation is desired. The muffler thus provides attenuation at a plurality of specific frequencies. The liner 14 also provides broad band attenuation.

The outer shell 12, liner 14, and dividing walls 16 preferably are constructed of steel or other suitable material having the requisite temperature capabilities, strength, and fatigue resistance, taking into consideration the conditions that will be experienced by the muffler in operation. The liner 14 can have openings 30 of various shapes.

Figure 4:
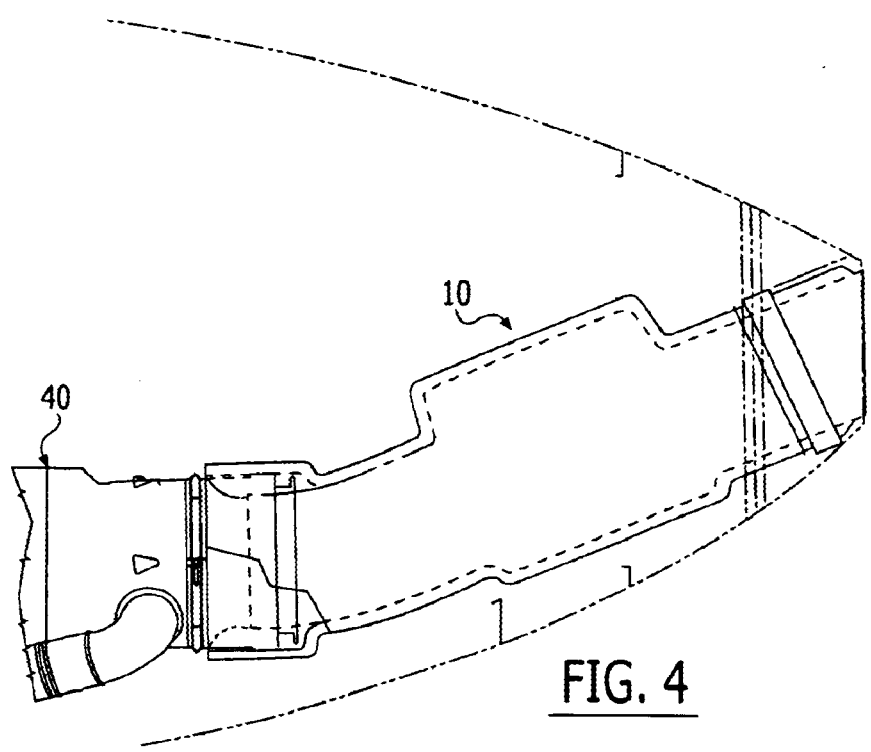
FIG. 4 is a side elevation of the muffler installed in the exhaust duct of a turbine engine in the tail cone of an aircraft.

FIG. 4 shows the muffler 10 installed in an exhaust duct of an auxiliary power unit 40 located in the tail cone of an aircraft. As shown, an advantage of the muffler is that the side of the muffler that protrudes radially outwardly the least can be oriented toward the closest structure of the aircraft. A conventional non-eccentric muffler would provide less distance between the muffler and the adjacent aircraft structure so that special high-temperature materials may have to be used in the aircraft structure, or the muffler may not fit at all in the available space. By providing a separation distance between the muffler and the adjacent structure, it may be possible to avoid having to make the aircraft structure from special high-temperature materials.

Many modifications and other embodiments of the invention will come to mind to one skilled in the art to which this invention pertains having the benefit of the teachings presented in the foregoing descriptions and the associated drawings. For example, although the muffler 10 is shown as being circular and cylindrical, it could instead be non-round and/or other than cylindrical, such as conical. The chambers 18a–f are shown as having a constant radial depth along the length of the chamber in the axial direction, but they could instead have a depth that varies along the axial direction. Six chambers 18a–f are illustrated, but any number of chambers greater than or equal to two could be used, there being no particular upper limit on the number of chambers. One or more of the chambers could also be subdivided so that there are two or more chambers located one after another along the axial direction; optional partition walls 42 are indicated in broken lines in FIG. 3 for this purpose. The dividing walls 16 are drawn as being purely radial and axial, but they could be leaned non-radially and/or skewed from the axial direction. The chambers 18a–f are shown as all having an approximately equal length in the circumferential direction and in the axial direction, but they could have different lengths in either or both of these directions. Other modifications could also be made within the scope of the invention. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An acoustic muffler comprising:

an outer shell of tubular configuration, the shell having a side wall encircling a longitudinal central axis of the shell;

a tubular liner disposed within the shell, a generally annular space defined between the liner and the side wall of the shell; and a plurality of dividing walls extending between the liner and the outer shell so as to divide the generally annular space into a plurality of chambers circumferentially spaced about the muffler, wherein at least some of the chambers extend only partially circumferentially about the liner, and wherein at least some of the chambers extend longitudinally between the shell and the liner for the entire length of the shell;

wherein a longitudinal central axis of the liner is radially offset from the longitudinal central axis of the shell such that the chambers have different depths in a radial direction of the muffler, the liner having at least one opening into each chamber.

2. The acoustic muffler of claim 1, wherein each dividing wall extends generally axially and radially.

3. The acoustic muffler of claim 1, wherein the chambers all have an approximately equal length in a circumferential direction.

4. An acoustic muffler according to claim 1 wherein one of the chambers having a smaller depth than the other chambers is located generally diametrically opposite from another of the chambers having a greater depth than the other chambers.

5. The acoustic muffler of claim 1, wherein the muffler has an inlet opening with a central axis of the inlet opening being radially offset from the central axis of the side wall of the shell.

6. The acoustic muffler of claim 5, wherein the central axis of the inlet opening is aligned with the central axis of the liner.

7. An acoustic muffler according to claim 1 wherein the depth of the chambers in the radial direction varies continuously from a minimum depth at one circumferential location to a maximum depth at another circumferential location opposite from the one circumferential location.

8. The acoustic muffler of claim 1, wherein the depth of each chamber in the radial direction is substantially constant over a length of the chamber in a longitudinal direction.

9. The acoustic muffler of claim 1, wherein a middle portion of the side wall of the shell is formed as a substantially cylindrical structure, and the side wall includes forward and aft portions respectively joined to forward and aft ends of the middle portion, the forward and aft portions each extending radially inwardly from the middle portion to a radially inner end, the radially inner ends of the forward and aft portions being joined to the liner.

10. An acoustic muffler comprising:

an outer shell of tubular configuration, the shell having a side wall encircling a longitudinal central axis of the shell wherein a middle portion of the side wall of the shell is formed as a substantially cylindrical structure, and the side wall includes forward and aft portions respectively joined to forward and aft ends of the middle portion, the forward and aft portions each extending radially inwardly from the middle portion to a radially inner end;

a tubular liner disposed within the shell, a generally annular space defined between the liner and the side wall of the shell, wherein the radially inner ends of the forward and aft portions being joined to the liner; and a plurality of dividing walls extending between the liner and the outer shell so as to divide the generally annular space into a plurality of chambers circumferentially spaced about the muffler, wherein at least some of the chambers extend only partially circumferentially about the liner, and wherein each chamber extends longitudinally from the forward portion of the side wall to the aft portion of the side wall;

wherein a longitudinal central axis of the liner is radially offset from the longitudinal central axis of the shell such that the chambers have different depths in a radial direction of the muffler, the liner having at least one opening into each chamber.

11. The acoustic muffler of claim 1, wherein at least one of the chambers is subdivided by at least one partition wall into at least two chambers located one after another in a longitudinal direction of the muffler.

* * * * *